Aug. 19, 1924.   1,505,860
F. BYFORD
METHOD OF AND APPARATUS FOR FORMING HOLLOW ARTICLES FROM PLASTIC MATERIAL
Filed Feb. 12, 1924   3 Sheets-Sheet 1

Inventor
Frederick Byford
By
Attorney

Aug. 19, 1924.
1,505,860
F. BYFORD
METHOD OF AND APPARATUS FOR FORMING HOLLOW ARTICLES FROM PLASTIC MATERIAL
Filed Feb. 12, 1924   3 Sheets-Sheet 2

Inventor
Frederick Byford.
By
Attorney

Aug. 19, 1924.  1,505,860
F. BYFORD
METHOD OF AND APPARATUS FOR FORMING HOLLOW ARTICLES FROM PLASTIC MATERIAL
Filed Feb. 12, 1924  3 Sheets-Sheet 3
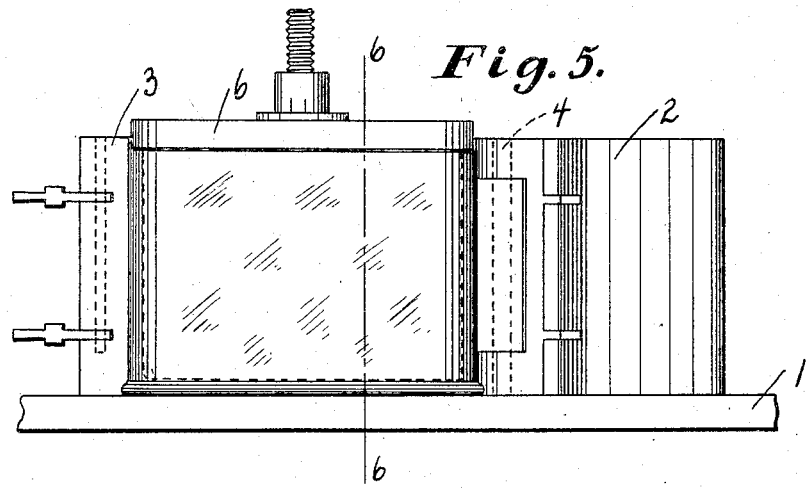
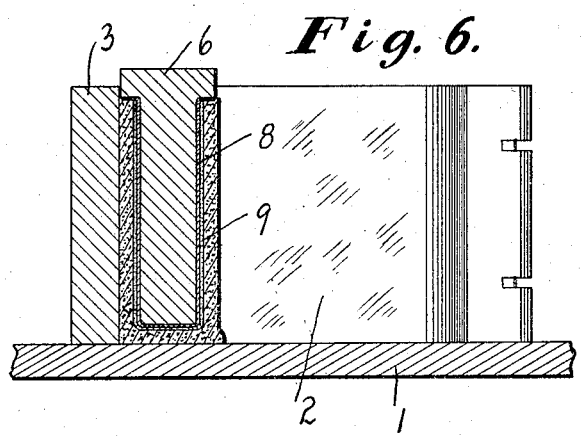
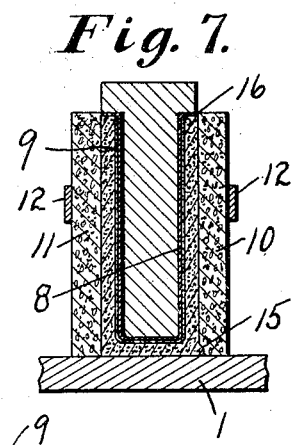
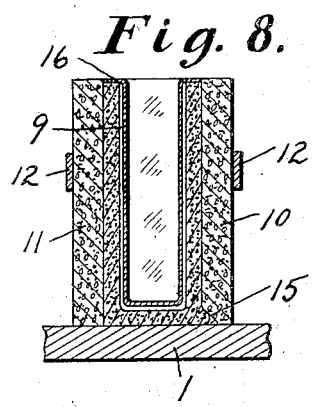
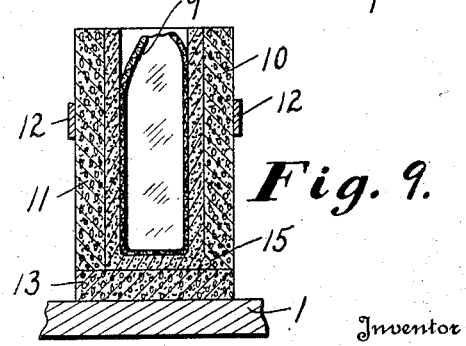
Inventor
Frederick Byford.
By
Attorney Patented Aug. 19, 1924.

1,505,860

UNITED STATES PATENT OFFICE.

FREDERICK BYFORD, OF KEYSER, WEST VIRGINIA.

METHOD OF AND APPARATUS FOR FORMING HOLLOW ARTICLES FROM PLASTIC MATERIAL.

Application filed February 12, 1924. Serial No. 692,321.

*To all whom it may concern:*

Be it known that I, FREDERICK BYFORD, a subject of the King of Great Britain, residing at Keyser, in the county of Mineral and State of West Virginia, have invented certain new and useful Improvements in Methods of and Apparatus for Forming Hollow Articles from Plastic Material, of which the following is a specification, reference being had to the accompanying drawings, forming a part thereof.

My invention relates to a method of and apparatus for forming hollow articles from plastic clay by pressure.

While many articles of ceramic ware are of such shapes that they can be formed from clay only by the hand of the potter with or without the aid of the potter's wheel there are many hollow articles, particularly those which are other than circular or approximately circular in cross section, which are of such shape that if formed by hand must be formed with little aid from the wheel and are therefore particularly expensive to make. Such articles are to a considerable extent formed by "casting", that is by forming a liquid mixture of clay into a mold having walls adapted to absorb the water of the mixture and leave a deposit of clay in the shape of the mold. For many articles of hollow ware particularly if of large size, this casting method is not well adapted.

It has long been recognized that it would be desirable to form articles of hollow ware of relatively large size by forcing a plunger into a body of plastic clay, of a consistency adapted for use in hand molding, to spread the clay against the inner surface of an enclosing mold. Such a method if practical is relatively inexpensive, does not require specially skilled labor, is rapid and tends to produce a uniform product. In attempts to make use of this method it has been found that the clay tends to adhere to the surfaces of the plunger and mold and in withdrawing the plunger and in removing the mold the surface of the molded article is liable to be so injured as to require considerable skill and effort to repair it. By oiling or greasing the surfaces of the plunger and mold adhesion of the clay is prevented, but more or less of the oil or grease will be left on or in the clay of the molded article. Any such oil must be removed since if left on or in the clay it will be volatilized when the article is subjected to the heat of the kiln and will leave or cause cracks. Oil or grease on the outer surface of the molded article may be readily removed by sponging off the surface but the difficulty of completely removing oil or grease from the interior without injury to the walls of the article, is so great that the use of oil or grease on the plunger is precluded and, as, prior to my present invention no way has been found by which the plunger could be withdrawn without the use of oil or grease to prevent adhesion of the clay to it, the use of the press for forming hollow articles from plastic clay has been practically abandoned.

It is the object of my present invention to provide means by which a plunger forced into a body of clay to spread it against the walls of a mold and to thus form an article of hollow ware, may be withdrawn without injury to the surface of the molded article, and without the use of any oil or grease. A further object of my invention is to provide a method by which articles of hollow ware may be formed in a press and may be held in shape during the manipulations necessary to finish their surfaces preparatory to the drying out preliminary to the baking or burning.

With the objects above indicated and other objects hereinafter explained in view my invention consists in the method and apparatus hereinafter described and claimed.

Referring to the drawings:

Figure 5 is a front view showing one part of the mold turned back to expose the front of the molded article.

Figure 6 is a vertical sectional view on line 6—6 of Figure 5.

Figure 7 is a vertical sectional view of the molded article as it appears after the plaster of Paris retaining mold has been placed about it.

Figure 8 is a view similar to Figure 7, but showing the article and retaining mold after the plunger has been withdrawn.

Figure 9 is a view similar to Figures 7 and 8 but showing the article and retaining mold after the shell has been withdrawn.

Figure 1:
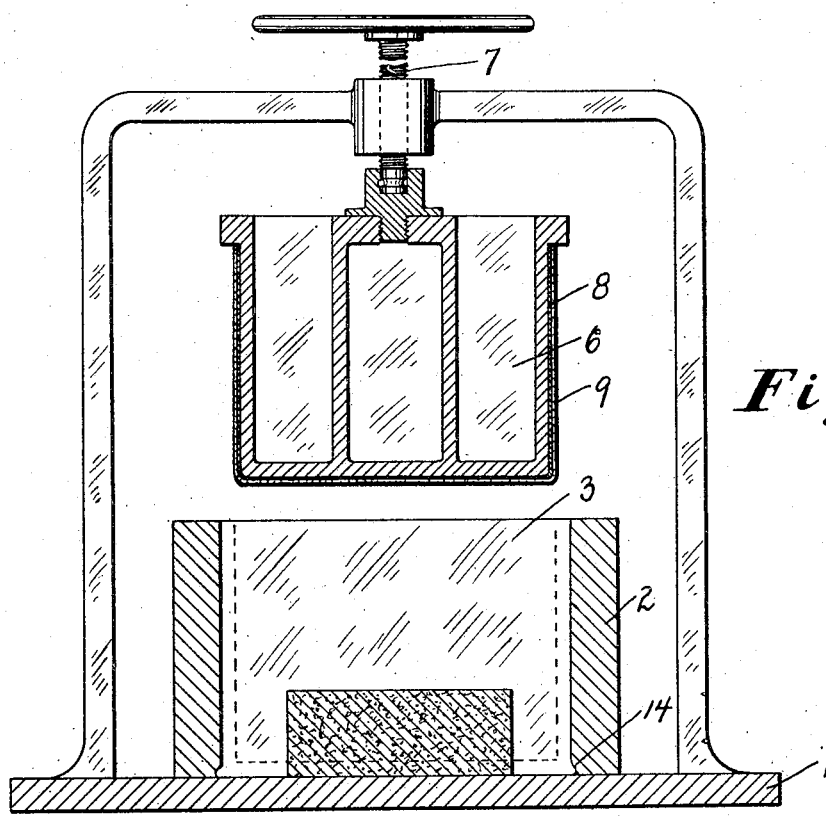
Figure 1 is a central vertical sectional view of the apparatus on a plane longitudinal of the mold showing the plunger raised.
Figure 2:
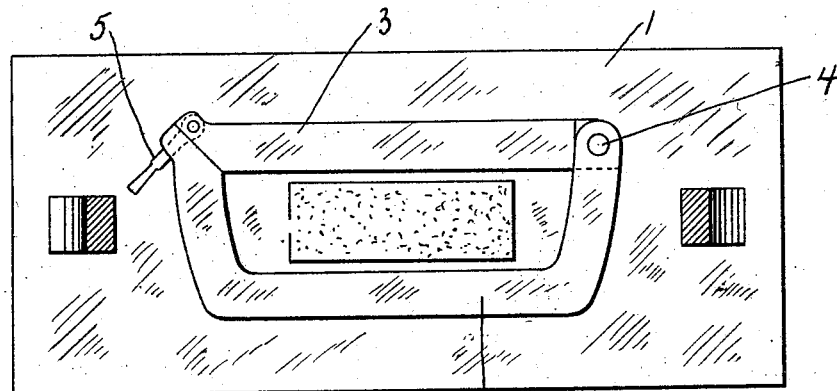
Fig. 2 is a horizontal sectional view on line 2—2 of Fig. 1.
Figure 3:
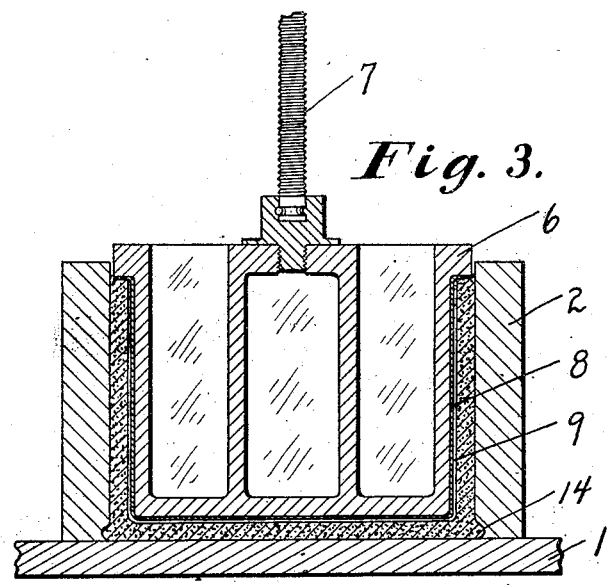
Fig. 3 is a view similar to Figure 1 but with the plunger in depressed position.
Figure 4:
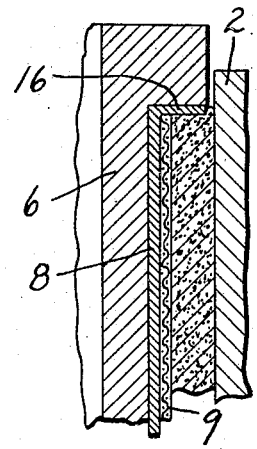
Figure 4 is a detail vertical sectional view on an enlarged scale showing the plunger with shell and envelope.
Figure 10:
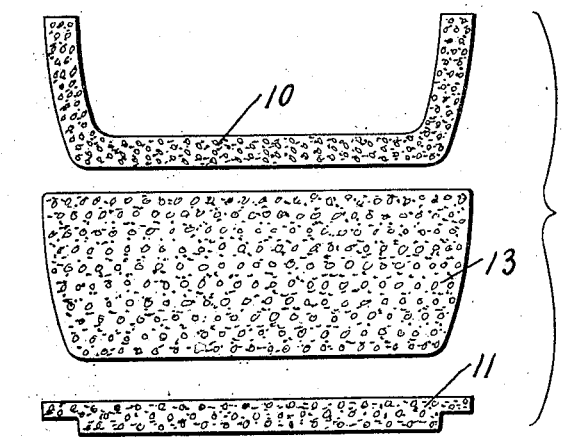
Figure 10 shows in plan view the several parts of the retaining mold.
Figure 11:
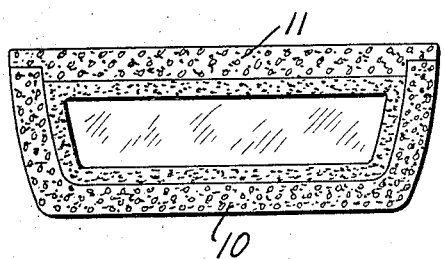
Figure 11 is a plan view of the article and retaining mold after the plunger has been withdrawn.

Referring to the drawings 1 indicates the flat bed plate of a press adapted for use in carrying out the method of my invention, 2 indicates the front half of the exterior mold and 3 indicates the back half. These halves are hinged together at one side edge as shown at 4 and are provided at the other side edge with clamping means of usual construction indicated at 5 for holding the two halves closed together. The hinge 4 and the clamping means 5 are secured in position on the bed plate 1 so that when the halves of the exterior mold are locked together the opening between them will be in proper position to receive the plunger 6. This plunger 6 is vertically movable by any convenient means, here shown as a screw 7, to enter the space between the halves of the exterior mold. The screw may be hand or power operated and any other usual means for effecting vertical movement of the plunger may be used.

The plunger 6 should be slightly tapered to facilitate its withdrawal from the article formed in the mold. On the plunger is fitted a shell 8 of thin material such as ordinary tin plate, this shell conforming to the shape of the plunger and fitting it snugly enough to be normally held on it by friction. Over this shell is fitted an envelope 9 of textile material, preferably cotton duck, conforming to the shape of the shell and fitting it snugly enough to be normally retained on it by friction.

10 and 11 indicate respectively the front and back halves of an enclosing or retaining mold corresponding as regards their inner faces to the halves 2 and 3 of the mold above described but are not connected together and are made of plaster of Paris. 12 is a metal strap adapted to enclose the halves 10 and 11 and hold them against the front and rear faces of the molded article which is here shown as a flush tank for water closets. 13 indicates a setter or supporting board for the molded article with its enclosing half molds 10 and 11 and may conveniently, though not necessarily, be a slab of plaster of Paris. The front half 2 of the mold is recessed along its lower edge as shown at 14 to permit the clay to be forced outward to form a bead along the lower edge of the molded tank and the front half of the plaster of Paris mold is provided at its lower edge with a recess 15 to receive this bead.

In carrying out the method of my invention the front half 2 of the mold, which is formed of metal, preferably cast iron, is swung on its hinge 4 to open position and the interior surface of this half, of the other half mold 3 and the surface of the bed plate 1 is oiled just sufficiently to prevent the clay when forced against these surfaces from sticking to them. The least possible oil necessary for this purpose should be used and particular care should be taken to avoid any excess of oil near the lower edge of the front half which might be forced into the clay which forms the bead at the lower edge of the tank. After the surfaces referred to have been oiled a mass of clay of suitable size is placed on the bed plate against the back half 3 and the front plate is swung to closed position and locked, the mass of clay being thus enclosed within the mold formed by the halves 2 and 3.

The plunger 6 carrying the shell 8 and with envelope 9 is then forced down into the mold until its lower end is within such distance of the bed plate as it is intended the thickness of the bottom of the tank shall be. As the lower end of the plunger enters the mass of clay it will force it upward against the inner faces of the mold halves 2 and 3 and compact it by pressure to form a firm body.

When the plunger has reached the limit of its downward movement the front half 2 is unlocked and swung to open position. This leaves the front of the molded tank exposed and this is trimmed and its surface sponged off to remove any traces of oil. The front half 10 of the plaster of Paris retaining mold is then fitted against this exposed front of the molded tank. The back half 3 is then swung into open position and the back of the molded tank is trimmed and sponged off and the back half 11 of the plaster of Paris retaining mold is applied to it and the two halves 10 and 11 are secured together by metal strips 12 enclosing the molded tank and holding it in shape and protecting it against injury in handling. The plunger 6 is then withdrawn from the shell 8, which is preferably provided at its upper edge with a flange 16 for this purpose, being held in the molded tank. The plunger having been withdrawn the molded tank with its enclosing mold of plaster of Paris may then be laid on its side and the bottom of the tank finished and sponged off to remove any trace of oil.

The tank with its enclosing mold is then turned to upright position and the shell 8 is then drawn out of the molded tank. The cloth envelope 9 clings to the inner face of the molded tank more firmly than it does to the shell so that the shell may be withdrawn leaving the cloth envelope still adhering to the inner wall of the tank and protecting its surface from the abrasion which would be likely to result if an unoiled metal surface were to be drawn over the surface of the molded clay. After the shell has been drawn out the cloth envelope 9 may be folded inward and so detached from the surface of the clay without abrasion. This cloth envelope absorbs more or less water squeezed out of the clay in the pressing, and being thus wet permits the shell to be readily drawn out without disturbing its contact with the clay and also lessens the adhesion of the cloth to the clay so that it may be detached by folding it inward.

After the cloth envelope has been removed the inner surface of the tank may be smoothed off, the plaster of Paris retaining mold preventing any outward bending of the walls from pressure from within in smoothing off and finishing the surface.

The molded tank is allowed to remain enclosed within the plaster of Paris mold for a few hours, preferably 12 hours or more, and is then sufficiently formed to be handled without protection. The plaster of Paris mold is then removed and the tank is completed by forming in it the usual openings for inlet and outlet pipes and for fastening means by which it may be secured in position for use. The molded tank thus finished is allowed to dry for a number of days and is then baked and after the first baking is coated with glaze and again baked.

While the method is described as applied to the manufacture of a flush tank, it may be applied to the manufacture of other articles of ceramic ware or to parts which are afterwards assembled to form complete articles, it being of course essential that the shape of the article or part of completed article, be of such shape that the plunger can be drawn out.

The plaster of Paris mold parts 10 and 11 are made sufficiently thick and strong to be readily handled without danger of breaking and may be used repeatedly for an indefinite period. The plaster of Paris tends to absorb moisture from the surface of the molded tank and to thus facilitate its drying; it does not, however, absorb enough moisture to prevent its reuse as soon as it is taken off from a molded tank.

The cloth envelope 9 tends to become filled with clay after repeated use and should be washed after which it may be again used. By the use of this cloth envelope it is made possible to withdraw the shell 8 without abrading the surface of the molded tank and without the use of oil. This envelope might be used on the plunger without the shell but as it is desirable to hold the molded tank in shape for a time after the plunger is removed so that it may be turned on one side to permit the bottom to be finished, it is important to use the shell.

While the method and apparatus described are particularly adapted for use in forming hollow articles from plastic clay it is obvious that it may be used in making hollow articles from other plastic material.

Having thus described my invention, what I claim is:

1. In apparatus for forming hollow articles from clay by pressing, the combination of a mold having its inner surface adapted to shape the exterior of the article, and a plunger adapted to enter the mold and to force clay contained therein into the space between its exterior and the inner surface of the mold, and to shape the interior of the article a shell of rigid sheet material fitting and enclosing the exterior of the plunger adapted to permit the plunger to be withdrawn from it so as leave the shell within and supporting the walls of the molded article, and an envelope of flexible material fitting and enclosing the exterior surface of the shell adapted to permit the shell to be withdrawn so as to leave the envelope within and against the inner surface of the walls of the molded article.

2. In a method of forming hollow articles of clay by forcing a plunger having its exterior adapted to shape the interior of the article into a body of clay enclosed within a separable part mold having its interior surface adapted to shape the exterior of the article, to form the article by forcing the clay into the space between the exterior surface of the plunger and the interior surface of the mold, preventing the clay from adhering to the interior surface of the mold by oiling said surface, and preventing it from adhering to the exterior surface of the plunger by enclosing the exterior surface of the plunger in an envelope of textile material adapted to permit the plunger to be withdrawn therefrom without causing movement of the envelope relative to the surface of the molded article.

3. In a method of forming hollow articles of clay by forcing a plunger having its exterior adapted to shape the interior of the article, into a body of clay enclosed within a separable part mold having its interior surface adapted to shape the exterior of the article, to form the article by forcing the clay into the space between the exterior surface of the plunger and the interior surface of the mold, preventing the clay from adhering to the interior surface of the mold by oiling said surface, and preventing it from adhering to the exterior surface of the plunger by enclosing said surface in a shell of sheet metal and enclosing the exterior surface of said shell in an envelope of textile material adapted to permit the plunger to be withdrawn therefrom without causing movement of the envelope relative to the surface of the molded article.

4. The herein described method of forming clayware by pressing which consists in placing a body of tempered clay between the separable parts of a mold having its inner surface adapted to shape the exterior of the molded article, forcing into the body of clay a plunger adapted to force the clay into the space between the exterior of the plunger and the inner face of the outer mold, and to shape the interior of the molded article, said plunger being provided with an enclosing envelope of textile material, moving one part of the outer mold away from the face of the molded article, wiping off the face of the molded article thus exposed, placing against the said face a part mold of rigid absorbent material, moving the other part of the outer mold away from the face of the molded article formed by it, wiping off the face of the molded article so exposed, placing against the said face a part mold of rigid absorbent material, securing the parts of said mold together, withdrawing the plunger from the shell, leaving the envelope in position, and finally folding the envelope inward to detach it from the inner surface of the molded article and removing it.

5. The herein described method of forming hollow articles of clay by pressing which consists in placing a body of tempered clay between the separable parts of a mold having its inner surface adapted to shape the exterior of the molded article and coated with oil, forcing into the body of clay a plunger adapted to force the clay into the space between the exterior of the plunger and the inner face of the outer mold, and to shape the interior of the molded article, said plunger being provided with an enclosing shell of relatively thin rigid material provided with an enclosing envelope of textile material, moving one part of the outer mold away from the face of the molded article, removing from the face of the molded article thus exposed any traces of oil, placing against the said face a part mold of rigid material, moving the other part of the outer mold away from the face of the molded article formed by it, removing from the face thus exposed any traces of oil, placing against the said face a part mold of rigid material, securing the parts of said mold together, withdrawing the plunger from the shell, withdrawing the shell, leaving the envelope in position, and finally folding the envelope inward to detach it from the inner surface of the molded article and removing it.

6. The herein described method of forming hollow articles of clay by pressing which consists in placing a body of tempered clay between the separable parts of a mold having its inner surface adapted to form the exterior of the molded article, and coated with oil, forcing into the body of clay a plunger adapted to force the clay into the space between the exterior of the plunger and the inner face of the outer mold, said plunger being provided with an enclosing shell of relatively thin rigid material provided with an enclosing envelope of textile material, moving one part of the outer mold away from the face of the molded article, removing from the face of the molded article thus exposed any traces of oil, placing against the said face a part mold of rigid material, moving the other part of the outer mold away from the face formed by it, removing from the face thus exposed any traces of oil placing against the said face a part mold of rigid material, securing the parts of said mold together, withdrawing the plunger from the shell, turning the molded article with its enclosing mold of rigid absorbent material on its side, removing from the bottom of the molded article any traces of oil, withdrawing the shell leaving the envelope in position, and finally folding the envelope inward to detach it from the inner surface of the molded article and removing it.

7. The herein described method of forming hollow articles of clay by pressing which consists in placing a body of tempered clay between the separable parts of a mold having its inner surface adapted to form the exterior of the molded article and coated with oil forcing into the body of clay a plunger adapted to force the clay into the space between the exterior of the plunger and the inner face of the outer mold, said plunger being provided with an enclosing shell of relatively thin rigid material provided with an enclosing envelope of textile material, moving one part of the outer mold away from the face of the molded article, removing from the face of the molded article thus exposed any traces of oil, placing against the said face a part mold of rigid absorbent material, moving the other part of the outer mold away from the face of the molded article formed by it, removing from said face thus exposed any traces of oil, placing against the said face a part mold of rigid absorbent material, securing the parts of said mold together, withdrawing the plunger from the shell, turning the molded article with its enclosing mold of rigid absorbent material on its side, removing from the bottom of the molded article any traces of oil, withdrawing the shell leaving the envelope in position, and finally folding the envelope inward to detach it from the inner surface of the molded article and removing it.

In testimony whereof I hereunto affix my signature.

FREDERICK BYFORD.